July 23, 1963     H. R. DAILY     3,098,815
PROCCESS FOR REGULATING FLOW OF CONTACT MATERIAL
Original Filed March 21, 1957
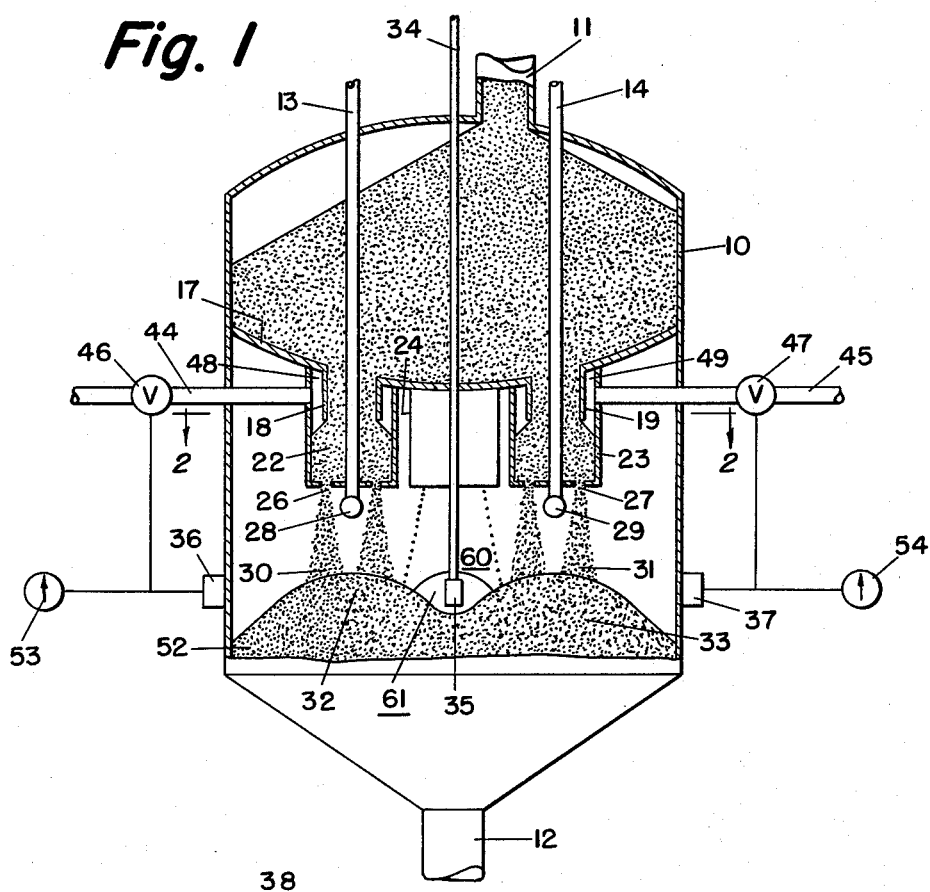
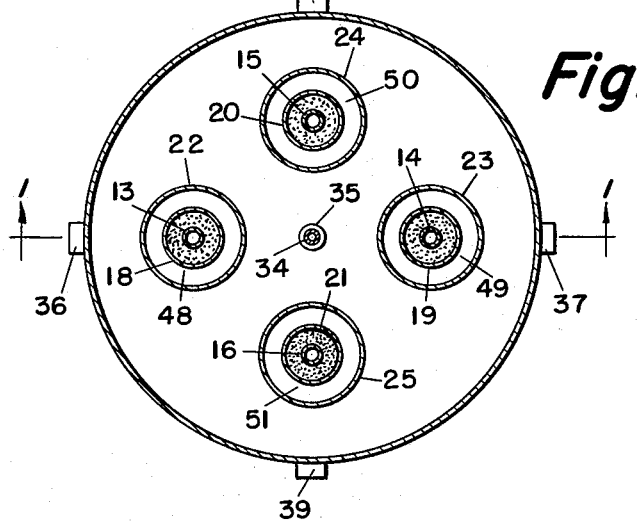
INVENTOR.
HOWARD R. DAILY
BY
Robert O. Spindle
ATTORNEY 3,098,815
Patented July 23, 1963

3,098,815
PROCESS FOR REGULATING FLOW OF
CONTACT MATERIAL
Howard R. Daily, Toledo, Ohio, assignor to Sun Oil Company, Philadelphia, Pa., a corporation of New Jersey
Original application Mar. 21, 1957, Ser. No. 647,534, now Patent No. 3,011,662, dated Dec. 5, 1961. Divided and this application June 30, 1959, Ser. No. 824,056
3 Claims. (Cl. 208—167)

This invention relates to process and apparatus for regulating the flow of granular solid contact material through a contacting vessel, for example a reaction vessel for use in promoting reactions by contact with granular solid contact material.

In the art of conversion of petroleum hydrocarbons by contact with granular solid contact material capable of promoting or catalyzing conversion of hydrocarbons, e.g. decomposition of high molecular weight petroleum materials to lower molecular weight products, it is known to gravitate the contact material through a portion of the reaction zone as a compact bed. It is also known to supply contact material to the upper surface of the bed as a falling stream of contact material, the liquid hydrocarbon reactants being sprayed into contact with the granular solids in the falling stream. It is often desirable to employ a plurality of such falling streams in parallel, spaced apart over the horizontal cross section of the reaction vessel. This construction is desirable in order to provide more nearly uniform level of the upper surface of the compact bed.

However, it frequently happens that the rate of flow of contact material in the various falling streams is not uniform, with the result that the surface of the compact bed will be lower in some parts than in others. This is an undesirable circumstance, since it tends to result in uneven temperature distribution in the reactor, poor efficiency in the cracking or other operation, and other disadvantages. The present invention provides a novel process and apparatus whereby these disadvantages can be avoided, and more nearly uniform level of the upper surface of the compact bed obtained.

The invention will be further described with reference to the attached drawing, wherein FIGURE 1 is a sectional elevational view of one embodiment of apparatus according to the invention, and FIGURE 2 is a sectional plan view of the same apparatus.

Referring to the drawing, reaction vessel 10 has an upper inlet 11 for granular solid contact material and a lower outlet 12 for granular solid contact material. Also associated with vessel 10 are four inlet conduits 13, 14, 15 and 16 for liquid hydrocarbon cracking charge. Transverse partition 17 within vessel 10 provides an upper chamber thereabove through which contact material introduced through line 11 gravitates as a compact mass into the four conduits 18, 19, 20 and 21 which depend from partition 17. Surrounding the conduits 18 to 21 are four sleeves 22, 23, 24 and 25 having closures at the lower end thereof. Each closure member contains an annular aperture, two of which are indicated at 26 and 27. At the lower end of the hydrocarbon inlet conduits 13, 14, 15 and 16 are spray nozzles, two of which are indicated by the numerals 28 and 29, adapted to discharge atomized liquid hydrocarbon cracking charge into the four falling streams of contact material, three of which are represented by the numerals 30, 31 and 60.

The compact bed 52 of contact material, onto which the four falling streams are discharged can be considered to have four portions, three of which are represented by the numerals 32, 33 and 61, directly beneath each of the four falling streams. A hollow shaft 34 has at the lower end thereof a holder 35 for a radioactive material such as radium, this holder being located centrally with regard to the four elevated portions of the compact bed. Four Geiger counters 36, 37, 38 and 39 are spaced around the outer wall of the vessel 10 at locations such that they are adapted to receive radiations transmitted, from the source of penetrative radiation within holder 35, through the corresponding portions of the compact bed. Associated with each counter is an indicator, two of which are represented by the numerals 53 and 54. These indicators can be of any suitable known construction, for indicating the magnitude of the radiation received by the associated counter.

Four fluid conduits, two of which are represented by the numerals 44 and 45, communicate with the sleeves 22 to 25 in order to permit the introduction of an inert fluid such as steam into the annular spaces 48, 49, 50 and 51 between the sleeve and the corresponding conduit for introduction of contact material. Each fluid conduit has a valve therein, two of which are represented by the numerals 46 and 47, for regulating the rate of flow of inert fluid through the conduit.

In operation, granular solid contact material is introduced through line 11 into vessel 10, gravitates through the upper chamber as a compact bed, and then through the conduits 18, 19, 20 and 21 as compact masses. The contact material passes through the apertures 26, 27 and others and falls therebeneath in the streams 30, 31 and others onto the upper surface of the compact bed. The rate of flow of contact material through the apertures is proportional to the pressure of the inert fluid in the chambers 48 to 51. Thus, by increasing this pressure by increasing the rate of introduction of inert fluid, the rate of flow of contact material through the aperture is increased, and vice versa. This effect, and suitable means for achieving it, are disclosed in United States Patent No. 2,726,938 issued December 13, 1955, to Raymond C. Lassiat.

Inert sealing medium is introduced by means not shown into the portion of the vessel above partition 17, and conventional means are provided to maintain a suitable pressure differential between that portion and the portion of the vessel between the upper surface of bed 33 and partition 17.

The heights of the various portions of the compact bed are subject to fluctuation in ordinary operation, this fluctuation being attributable to differences in the rate of flow of contact material in the different falling streams. Thus for example, because of some unbalance in the operation, the upper surface of portion 32 may rise. When this occurs, the amount of radiation transmitted from the radium in holder 35 through the elevated portion 32 decreases, because of the additional contact material through which the radiations pass. At the same or a different time, the upper surface of portion 33 may fall for example, and the amount of radiation transmitted through the portion 33 to the counter 37 increases when this occurs, because of the lesser amount of contact material through which the radiations pass.

According to the present invention, upon a decrease in the amount of radiation received by counter 36 for example, the opening of valve 46 is decreased, with resulting decrease in pressure in zone 48. This results in a decrease in the rate of flow of contact material through aperture 26 and restores the desired level of the portion 32. Similarly, upon an increase in the amount of radiation received by counter 37 for example, the opening of valve 47 is increased, thereby to increase pressure in zone 49, increase the rate of flow of contact material through aperture 27, and restore the desired level of portion 33.

In this manner, the level of the upper surface of the compact bed is maintained more nearly uniform, and the rates of flow of contact material in the various falling streams are maintained substantially equal. This results in improved efficiency in the cracking operation.

The operation has been described with reference to a process for conversion of hydrocarbon material by contact with granular solid contact material. However, it is to be understood that the invention is advantageously employed in any system where a plurality of horizontally spaced apart falling streams of contact material are discharged onto the upper surface of a compact bed, the level of which it is desired to maintain substantially constant.

It is further to be understood that the invention contemplates the use of any means for regulating the rate of flow of contact material in the various falling streams, in response to changes in the amount of radiation transmitted through the spaces beneath the upper ends of the respective falling streams. The particular method described, involving changes in inert fluid pressure as a means of changing the rate of flow of contact material through an orifice, is preferred in that it avoids the use of moving parts within the vessel 10. However, it is to be understood that other means for regulating the flow of contact material, as well know in the art, e.g. slide valves or other types of valves in the contact material conduits, can be employed. The present invention resides in separately regulating by any suitable means the rate of flow of contact material in each of a plurality of falling streams, in accordance with the amount of radiation transmitted through the space beneath the upper end of each falling stream.

In the operation previously described, the radiations transmitted from the source pass through a portion of the compact bed of solids in ordinary operation, and either a rise or a fall in the level of the compact bed changes the amount of radiation transmitted. It is also within the scope of the invention for the source and counter to be positioned above the upper surface of the compact bed in ordinary operation, in which case only an increase in the level of the upper surface of the compact bed changes the amount of radiation transmitted, whereupon the rate of flow of contact material in the particular falling stream involved is reduced in order to lower the level until it is again beneath the source and counter.

It is also within the scope of the invention to provide a plurality of vertically spaced sources of penetrative radiation in the central portion of the vessel. In stabilized operation, some of these sources, in one embodiment, can transmit radiations to the counter without passing through any portion of the bed of contact material, whereas radiations from some of the lower sources pass through a portion of the bed before reaching the counter. An increase in bed level reduces the amount of radiations transmitted, and a decrease in bed level increases the amount transmitted. In the light of the present specification, a person skilled in the art can determine the desired number and spacing of sources in this embodiment in accordance with the circumstances of a given case.

According to the present invention, when the amount of radiation transmitted through portion 32 for example decreases, this result is indicated by the indicator 53, whereupon the opening of valve 46 is decreased in order to decrease the rate of introduction of inert fluid into annular space 48. This results in a reduction in the rate of flow of contact material through orifice 26 and a consequent lowering of the level of the upper surface of portion 32. The decrease in the opening of valve 46 can be performed manually or automatically within the scope of the invention. Thus, if desired, any suitable known means can be employed for automatically changing the opening of valve 46 in response to a change in the amount of radiation received by counter 36. Such means are capable of decreasing the opening of valve 46 when the amount of radiation received falls below a predetermined level, and of increasing the opening of valve 46 when the amount of radiation received rises above that predetermined level. Means for automatically performing such changes in valve position are well known in the art, and any suitable known means can be employed. It is also within the scope of the invention for the change in the valve position to be performed manually by an operator after observing the change in reading of the indicator 53. The same considerations apply with regard to the other valves and indicators.

The invention has been previously described with reference to a system wherein four annular falling curtains of contact material are provided. It is to be understood that the invention is applicable to any system containing two or more such falling curtains. Preferably, the falling curtains are spaced uniformly over the cross section of the vessel, in order that contact material is distributed over substantially equal portions of the cross section from each falling curtain.

In the operation described previously in connection with the drawing the counters such as counters 36 and 37 are positioned on substantially the same horizontal level as a single source of penetrative radiation. It is also within the scope of the invention to position the counters on different horizontal levels from that of a single source, or to provide a plurality of sources spaced over a vertical span which may or may not include the level of the counters. Any suitable arrangement can be employed which will provide the desired result of providing a change in the amount of radiation received when the level of the upper surface of the elevated portions of the compact bed changes.

The present invention is particularly advantageously applied to hydrocarbon conversion processes involving contact of liquid hydrocarbon material with granular solid contact material. Cracking, coking, reforming, desulfurization processes, etc., are typical of the types of conversion to which the present invention may be applied. A particularly beneficial application of the invention is in hydrocarbon cracking processes. Typical operation in such process involves introducing heated contact material, at a temperature for example within the approximate range from 800° F. to 1200° F., into a cracking zone, and introducing hydrocarbon charge into the cracking zone at a temperature within the approximate range from 600° F. to 900° F. The contact material withdrawn from the cracking zone is introduced into a regeneration zone, wherein it is contacted with free-oxygen containing gas under conditions suitable for oxidation of carbonaceous materials deposited on the solids during the cracking operation. It is then customary to elevate the solids by suitable known means to a position above the cracking vessel, and gravitate the solids as a compact mass through the cracking vessel again.

Natural or activated clays, bauxite, activated alumina, synthetic silica-alumina catalyst, etc., are examples of catalyst materials commonly employed in hydrocarbon conversion processes. Zirkite, mullite, corhart, etc., are examples of refractory heat transfer materials which can be employed as conversion-supporting contact materials in such processes. The particle size of the contact material employed in such processes is generally within the approximate range from 3 to 20 mesh on the United States Sieve Series scale.

It is not necessary according to the invention that, in stabilized operation, the portions 32 and 33 and others should be dome-shaped as shown in the drawing. It is within the scope of the invention to maintain by suitable means a substantially level upper surface in stabilized operation. In this embodiment, a single source of penetrative radiation can be employed, positioned slightly above the upper surface at the stabilized level. Alternatively, a plurality of sources can be employed, with sources both above and below the upper surface at the stabilized level.

If desired, downcomers of suitable known construction and positioning can be employed, spaced around the periphery of the vessel, to assist in maintaining uniform bed level. Such downcomers are disclosed in numerous patents, e.g. United States Patent No. 2,683,109 issued July 6, 1954, to David E. Norris. Also, a downcomer can be employed substantially on the longitudinal axis of the vessel, in the position occupied by the lower portion of shaft 34 in the drawing.

The latter downcomer functions to avoid the presence of the depressed portion of the bed level at the center of the vessel. When such downcomer is employed, the radium source can be positioned at the wall of the downcomer. If desired, a plurality of sources can be employed spaced around the wall of the downcomer, though one source in generally sufficient.

Any suitable known material for providing penetrative radiation which is absorbed more by the contact material than by the fluid medium in the contacting vessel can be employed according to the invention. By employing a hollow shaft such as the shaft 34 in the drawing, the source can be introduced and withdrawn without affecting the rest of the apparatus or operation. However, any other suitable means of positioning and supporting the source within the vessel can be employed.

This application is a division of copending application Serial No. 647,534 filed March 21, 1957, now Patent No. 3,011,662.

The invention claimed is:

1. Process for regulating flow of granular solid contact material which comprises: passing granular solid contact material through a portion of the height of an elongated contacting zone as a plurality of horizontally spaced apart falling streams, onto the upper surface of a compact, downwardly moving bed of contact material; transmitting penetrative radiation from a central position relative to said falling streams laterally through each of the spaces directly beneath the upper ends of said falling streams; detecting the amount of radiation transmitted through each of the spaces, the amount being in inverse relationship to the height of the upper surface of the bed in the portion of the zone through which the radiation passes; decreasing the rate of flow of contact material in a given falling stream in response to a decrease in the amount of radiation transmitted through the space beneath the upper end of that falling stream; and increasing the rate of flow of contact material in a given falling stream in response to an increase in the amount of radiation transmitted through the space beneath the upper end of that falling stream.

2. Process according to claim 1 wherein said decreasing is performed by decreasing the pressure exerted on a body of contact material while passing through an orifice into the falling stream, and said increasing is performed by increasing the pressure exerted on said body while passing through said orifice.

3. Process according to claim 1 wherein said contact material is a cracking catalyst, wherein liquid hydrocarbons are introduced at 600 to 900° F. into contact with said falling streams of contact material at 800 to 1200° F., and wherein the hydrocarbons are subjected to catalytic cracking by contact with the contact material.

References Cited in the file of this patent

UNITED STATES PATENTS

| | | |
|---|---|---|
| 2,458,162 | Hagerbaumer | Jan. 4, 1949 |
| 2,613,326 | Herzog | Oct. 7, 1952 |
| 2,674,363 | Graham | Apr. 6, 1954 |
| 2,726,938 | Lassiat | Dec. 13, 1955 |
| 2,750,144 | Beckwith | June 12, 1956 |
| 2,828,422 | Steierman | Mar. 25, 1958 |

OTHER REFERENCES

Weighing Bagasse and Sugar With Gamma Rays, by Burr et al., from Hawaiian Sugar Technologists, 1954.